(12) United States Patent
Yang et al.

(10) Patent No.: US 9,752,052 B2
(45) Date of Patent: Sep. 5, 2017

(54) AUTO-REPAIRING COMPOSITIONS FOR OVERCOAT LAYER, METHOD OF PRODUCING THE SAME, AND DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Tonghua Yang, Beijing (CN); Min Li, Beijing (CN); Jikai Zhang, Beijing (CN); Sikai Zhang, Beijing (CN); He Feng, Beijing (CN)

(73) Assignees: BOE TECHNOLOGY GROUP CO., LTD., Beijing (CN); BEIJING BOE DISPLAY TECHNOLODY CO., LTD., Beijing (CN)

( * ) Notice: Subject to any disclaimer, the term of this patent is extended or adjusted under 35 U.S.C. 154(b) by 64 days.

(21) Appl. No.: 14/369,464

(22) PCT Filed: Dec. 20, 2013

(86) PCT No.: PCT/CN2013/090022
§ 371 (c)(1),
(2) Date: Jun. 27, 2014

(87) PCT Pub. No.: WO2015/007061
PCT Pub. Date: Jan. 22, 2015

(65) Prior Publication Data
US 2015/0030843 A1    Jan. 29, 2015

(30) Foreign Application Priority Data
Jul. 15, 2013 (CN) .......................... 2013 1 0302390

(51) Int. Cl.
| | | |
|---|---|---|
| *C08K 5/101* | (2006.01) | |
| *C09D 133/06* | (2006.01) | |
| *C09D 175/04* | (2006.01) | |
| *C09D 133/08* | (2006.01) | |
| *C09D 133/14* | (2006.01) | |
| *C09D 163/00* | (2006.01) | |
| *G02F 1/1335* | (2006.01) | |
| *C09D 4/06* | (2006.01) | |
| *C08F 222/10* | (2006.01) | |
| *C08G 59/42* | (2006.01) | |
| *C08G 59/44* | (2006.01) | |

(52) U.S. Cl.
CPC .......... *C09D 175/04* (2013.01); *C08F 222/10* (2013.01); *C08G 59/4215* (2013.01); *C08G 59/4223* (2013.01); *C08G 59/44* (2013.01); *C08K 5/101* (2013.01); *C09D 4/06* (2013.01); *C09D 133/06* (2013.01); *C09D 133/068* (2013.01); *C09D 133/08* (2013.01); *C09D 133/14* (2013.01); *C09D 163/00* (2013.01); *G02F 1/133516* (2013.01); *C08F 2222/104* (2013.01); *G02F 2001/133519* (2013.01); *Y10T 428/254* (2015.01)

(58) Field of Classification Search
CPC ......... B82Y 30/00; B82Y 40/00; B82Y 20/00; B82Y 99/00; B82Y 10/00; B82Y 5/00; C08G 77/26; C08G 59/4085; C08G 77/20; C08G 77/38; C08G 59/4215; C08G 59/4223; C08G 59/44; C08F 222/10; C08F 2222/104; C08K 5/101; C09D 133/06; C09D 133/068; C09D 133/08; C09D 133/14; C09D 163/00; C09D 175/04; C09D 4/06; G02F 1/133516; G02F 2001/133519; Y10T 428/254
USPC ........... 428/327, 402-402.24, 403, 404, 407, 428/321.1, 474.4; 522/39, 33; 427/331, 427/389.9, 212, 213-213.36, 483, 256; 264/534, 5, 41, 4-4.7
See application file for complete search history.

(56) References Cited

U.S. PATENT DOCUMENTS

| | | | |
|---|---|---|---|
| 2004/0248030 A1* | 12/2004 | Kim ....................... | G03F 7/038 |
| | | | 430/270.1 |
| 2015/0168827 A1* | 6/2015 | Yang ....................... | G02B 1/04 |
| | | | 430/280.1 |

FOREIGN PATENT DOCUMENTS

| | | |
|---|---|---|
| CN | 101319055 A | 12/2008 |
| CN | 101395535 A | 3/2009 |
| CN | 102773053 A | 11/2012 |
| CN | 103360857 A | 10/2013 |

(Continued)

OTHER PUBLICATIONS

UV Chem-keys Co., Ltd: 2-Benzyl-2-dimethylamino-1-(4-morpholinophenyl)-butanone-1, 2009. http://www.uvchemkeys.com/indust_cpzx_view.asp?id=206&kind_type=41&kind_next=0.*

(Continued)

*Primary Examiner* — Irina S Zemel
(74) *Attorney, Agent, or Firm* — Ladas & Parry LLP

(57) ABSTRACT

Disclosed are an auto-repairing composition for overcoat layer, a method of producing the same, and a display apparatus. The composition for overcoat layer comprising 1-10 wt % of microcapsules based on the total weight of the composition for overcoat layer, said microcapsule including a capsule wall and a capsule core, wherein the capsule wall comprises an alkali-insoluble resin, and the capsule core comprises, based on the total weight of the capsule core, 30-60 wt % of a photo-curable unsaturated oligomer, 30-60 wt % of a photo-polymerizable monomer, 1-10 wt % of a photo-initiator, and 0-5 wt % of additive.

11 Claims, No Drawings

(56) References Cited

FOREIGN PATENT DOCUMENTS

CN 103376657 A 10/2013

OTHER PUBLICATIONS

Second Chinese Office Action dated Oct. 27, 2014; Appln. No. 201310302390.3.
Chinese Notice of Allowance dated Dec. 4, 2014; Appln. No. 201310302390.3.
International Preliminary Report on Patentability Appln. No. PCT/CN2013/090022; Dated Jan. 19, 2016.
International Search Report mailed Apr. 25, 2014; PCT/CN2013/090022.
First Chinese Office Action dated May 5, 2014; Appln. No. 20130302390.3.

* cited by examiner

AUTO-REPAIRING COMPOSITIONS FOR OVERCOAT LAYER, METHOD OF PRODUCING THE SAME, AND DISPLAY APPARATUS

TECHNICAL FIELD

Embodiments of the present invention relate to an auto-repairing composition for overcoat layer, a method of producing the same, and a display apparatus.

BACKGROUND

In flat panel displays (FPDs), Thin Film Transistor Liquid Crystal Display (briefly, TFT-LCD) are characterized in small volumes, low power consumption, relatively low production cost, and non-radiations, and thus predominates in the current FPD market.

Currently, the primary structure of TFT-LCD comprises an array substrate and a color filter substrate (CF) assembled together. Among others, the color filter substrate comprises primarily a glass substrate, a Black Matrix (briefly, BM), a color photoresist, and an Overcoat (briefly, OC) layer. In general, BM is arranged between the color patterns formed from the color photoresist in pattern of grids, stripes, or patches, and serves primarily to improve the frame contrast by inhibiting the mixing of various colors. BM can also block scattered light so as to prevent TFT abnormal operation caused by inter-pixel light leakage. The color photoresist comprises red (R), green (G), and blue (B) color layers. For ensuring color uniformity of the color filter substrate and preventing light leakage, there are overlapping regions having a certain width between the R, G, B color photoresists and BMs, and such width is generally more than 3 microns. Moreover, the heights of the R, G, B color photoresists within the overlapping regions are relatively higher than other regions, thereby generating a relatively large height difference. For eliminating such height difference, it is required to apply an layer of OC material to the surface of the R, G, B photoresist to ensure the surface flatness of CF, thereby ensuring the uniformity of rubbing of alignment layer and achieving a high-quality frame. Moreover, the OC layer can also serve as a protective layer to prevent micro-molecule species in the color layer from migrating into and contaminating the liquid crystal layer to cause an unevenness of color. Thus, the flatness and completeness of the surface of the OC layer is essential to improving the quality of the TFT-LCD products. For avoiding the defect of OC layer, the prior art process needs a repair procedure after the formation of the OC layer. Such procedure can repair the OC layer via finishing repair. However, there is not yet effective repair means for addressing the defects caused by the damage of OC layer.

SUMMARY

To address the aforesaid problems, embodiments of the present invention provides an auto-repairing composition for overcoat layer, which can auto-repair the damage of the overcoat layer under light radiation, thereby improving substantially the pass ratio of products.

An embodiment of the present invention provides an auto-repairing composition for overcoat layer comprising 1-5 wt % of microcapsules based on the total weight of the composition for overcoat layer, said microcapsules having a capsule wall and a capsule core, wherein the capsule wall comprises an alkali-insoluble resin, and the capsule core comprises, based on the weight of the capsule core:
  30-60 wt % of photo-curable unsaturated oligomer;
  30-60 wt % of photo-polymerizable monomer;
  1-10 wt % of a photo initiator; and
  0-5 wt % of an additive.

In an aspect, the composition for overcoat layer further comprises, based on the total weight of the composition for overcoat layer:
  1-20 wt % of epoxy group-containing acrylate resin;
  1-20 wt % of curing agent;
  70.5-83.5 wt % of organic solvent; and
  0.01-2 wt % of an adjuvant.

Another embodiment of the present invention provides a method of producing the composition for overcoat layer comprising:
  mixing and dispersing 30-60 wt % of photo-curable unsaturated oligomer, 30-60 wt % of photo-polymerizable monomer, 1-10 wt % of photoinitiator and 0-5 wt % of additive based on the total weight of the capsule core to produce a composition for capsule core;
  adding the composition for capsule core dropwise into a resinous material for forming the capsule wall and stirring to faint a suspension of microcapsules;
  filtering the suspension of microcapsules, screening, drying, and curing to produce microcapsules; and
  mixing 1-5 wt % of microcapsules based on the total weight of the composition for overcoat layer with other components of the composition for overcoat layer to form the composition for overcoat layer.

Still another embodiment of the present invention provides a display apparatus comprising a color filter substrate, wherein the composition for overcoat layer in accordance with the embodiments of the present invention or produced in accordance with the method of the embodiments of the present invention is used to form an overcoat layer of the color filter substrate.

DETAILED DESCRIPTION

To address the problem of product defects caused unrepaired damages of an OC layer, an embodiment of the present invention provides a composition for overcoat layer comprising microcapsules having a capsule wall and a capsule core. When damages appear in the OC layer formed from the composition, the capsule wall cracks under the damage shear force so that the materials of capsule core flow out. The photo-curable unsaturated oligomer, photo-polymerizable monomer and photoinitiator contained in the capsule core cure under light radiation, repairing the damage and maintaining the completeness and flatness, and thereby improving the pass ratio of products. Due to the incorporation of microcapsules into the composition for overcoat layer, the subsequent procedure of repairing the OC layer can be omitted, thereby saving the production and improving the productivity.

Hereinafter the present invention is further illustrated in details with reference to the examples.

An embodiment of the present invention provides a composition for overcoat layer comprising 1-10 wt % of microcapsules based on the total weight of the composition for overcoat layer, said microcapsules having a capsule wall and a capsule core, wherein the capsule wall comprises an alkali-insoluble resin, and the capsule core comprises, based on the weight of the capsule core, 30-60 wt % of photo-curable unsaturated oligomer;
30-60 wt % of photo-polymerizable monomer;
1-10 wt % of a photoinitiator; and
0-5 wt % of an additive.

In an aspect, the photo-curable unsaturated oligomer can comprise one or more selected from the group consisting of epoxy acrylic resin, polyester acrylic resin, and polyurethane acrylate. The photo-polymerizable monomer can comprise one or more selected from the group consisting of dipentaerythritol hexacrylate (DPHA), trimethylolpropane triacrylate (TMPTA), pentaerythritol tetracrylate (PETA), and dipentaerythritol pentacrylate (DPPA). The photoinitiator can comprise one or more selected from the group consisting of benzoin-based compounds, such as, benzoin, benzoin dimethylether; benzil-based compounds, such as, deoxybenzoin; alkylphenone-based compounds, such as, $\alpha$-hydroxyalkylphenone; acylphosphine oxides, such as, aroylphosphine oxide, dibenzoylphenylphosphine oxide; benzophenone-based compounds, such as, benzophenone, 2,4-dihydroxybenzophenone; and thioxanthone-based compounds, such as, thiopropoxythioxanthone, isopropylthioxanthone. For instance, the photoinitiator can be one or more selected from the group consisting of 2-hydroxy-2-methyl-1-phenylacetone, 2-methyl-2-(4-morpholinyl)-1-[4-(methylthio)phenyl]-1-acetone, 2-hydroxy-2-methyl-1-phenylacetone, 1-hydroxycyclohexylphenylketone or 2-hydroxy-2-methyl-1-phenylacetone.

In a further embodiment, the composition for overcoat layer can further comprise, based on the total weight of the composition for overcoat layer:
1-20 wt % of epoxy group-containing acrylate resin;
1-20 wt % of curing agent;
70.5-83.5 wt % of organic solvent; and
0.01-2 wt % of an adjuvant.

In an aspect, the epoxy group-containing acrylate resin can comprise one or more selected from the group consisting of methyl acrylate-modified epoxy resin, methyl methacrylate-modified epoxy resin, ethyl acrylate-modified epoxy resin, ethyl methacrylate-modified epoxy resin, butyl acrylate-modified epoxy resin, butyl methacrylate-modified epoxy resin, acrylate copolymer-modified epoxy resin and methacrylatecopolymer-modified epoxy resin. The curing agent can comprise one or more selected from the group consisting of organic acids, anhydrides, aliphatic amines, acromatic amines, and amides, such as, one or more selected from the group consisting of maleic anhydride, phthalic anhydride, trimellitic anhydride and polyamide resin. The organic solvent can comprise one or more selected from the group consisting of alcohols, esters, ketones, an ethers, such as, one or more selected from the group consisting of propylene glycol monomethyl ether acetate and 3-ethyl ethoxypropionate.

In another aspect, the alkali-insoluble resin can comprise epoxy resin or polyurethane resin, such as, Epoxy Acrylic Resin 6118, Polyester Acrylic Resin SK8924 or Polyurethane Acrylate SM6201 available from Sanmuchem, Inc., Jiangsu, P.R.C.

In yet another aspect, the additive and the adjuvant can be one or more selected from the group consisting of adhesion promotors and leveling agents, respectively. For instance, the adhesion promoters can be $\gamma$-(2,3-epoxypropoxy)propyltrimethoxysilane (KH-560, available from Mingyang Chem Inc., Shangdong, P.R.C.) or $\gamma$-methylacryloyloxypropyltrimethylsilane (KH-570, available from Mingyang Chem Inc., Shangdong, P.R.C.), and the leveling agent can be EFKA-3883 available from EFKA, Holand.

An embodiment of the present invention further provides a method of producing a composition for overcoat layer comprising:
mixing and dispersing 30-60 wt % of a photo-curable unsaturated oligomer, 30-60 wt % of a photo-polymerizable monomer, 1-10 wt % of a photoinitiator, and 0-5 wt % of an additive based on the total weight of a capsule core to produce a composition for capsule core;
adding the composition for capsule core dropwise into a resinous material for forming a capsule wall to form a suspension of microcapsules;
filtering the suspension of microcapsules, screening, drying and curing, to produce microcapsules; and
mixing 1-10 wt % of microcapsules based on the total weight of the composition for overcoat layer with other components of the composition for overcoat layer to form the composition for overcoat layer.

In an aspect, the other component of the composition for overcoat layer comprises 1-20 wt % of epoxy group-containing acrylate resin, 1-20 wt % of curing agent, 70.5-83.5 wt % of organic solvent and 0.01-2 wt % of an adjuvant based on the total weight of the composition for overcoat layer.

In another aspect, mixing 1-10 wt % of microcapsules based on the total weight of the composition for overcoat layer with other components of the composition for overcoat layer to form the composition for overcoat layer comprises:
mixing, based on the total weight of the capsule core, 30-60 wt % of the photo-curable unsaturated oligomer, 30-60 wt % of the photo-polymerizable monomer, 1-10 wt % of the photoinitiator, and 0-5 wt % of the additive to form a mixture; and
dispersing the mixture under agitation at 300 to 1,000 rpm for 1 to 4 hours.

The embodiment of the present invention further provides a display apparatus comprising a color filter substrate, wherein the composition for overcoat layer in accordance with the embodiment of the present invention or produced in accordance with the method of the embodiment of the present invention is used to form the overcoat layer of the color filter substrate. For instance, the display apparatus can be any products or parts having a display function, e.g., liquid crystal panels, electric papers, OLED panels, liquid crystal television, liquid crystal display, digital frames, mobile phones, or tablet PC.

The following examples are provided to further illustrate the composition for overcoat layer of the present invention and the method of producing the same. However, the present invention is not limited to those examples.

I. Preparation of Composition for Capsule Core

Examples 1 to 5 produce compositions for capsule core. The compositions of Examples 1 to 5 are prepared as follows: 30-60 wt % of photo-curable unsaturated oligomer, 30-60 wt % of photo-polymerizable monomer, 1-10 wt % of a photoinitiator, and 0-5 wt % of an additive are mixed together to form a mixture. The used materials and the amounts thereof are listed in Table 1 below.

The mixtures are dispersed under agitation at 600 rpm for 2 hrs to produce the composition for capsule core. The agitation may be carried out in a manner of mechanical agitation.

TABLE 1

Components and Weight Percents thereof of the Capsule Cores of Examples 1 to 5

| Components and Weight Percents Thereof of the Capsule Core | Example 1 | Example 2 | Example 3 | Example 4 | Example 5 |
|---|---|---|---|---|---|
| Photo-curable unsaturated oligomer | 30 wt % epoxy acrylic resin 6118 | 39 wt % polyester acrylic resin SK8924 | 47 wt % epoxy acrylic resin 6118 | 50 wt % epoxy acrylic resin 6118 | 60 wt % polyurethane acrylate SM6201 |
| Photo-polymerizable monomer | 60 wt % DPHA | 30 wt % DPHA; 29 wt % TMPTA | 20 wt % DPHA; 16 wt % PETA; 10 wt % TMPTA | 30 wt % PETA; 15 wt % TMPTA | 30 wt % DPPA |
| Photoinitiator | 10 wt % 2-hydroxy-2-methyl-1-phenylacetone (1173) | 1 wt % 2-methyl-2-(4-morpholinyl)-1-[4-(methylthio)phenyl]-1-acetone (907) | 5 wt % 2-hydroxy-2-methyl-1-phenylacetone (1173) | 2 wt % 1-hydroxy-cyclohexyl-phenylketone (184) | 5 wt % 2-hydroxy-2-methyl-1-phenylacetone (1173) |
| Additive | 0 | 1 wt % KH-560 | 2 wt % KH-560 | 3 wt % KH-560 | 3 wt % KH-560; 2 wt % KH-570 |

II. Preparation of Microcapsules

Example 6 to 9 produce microcapsules. The capsule core composition preparated in accordance with Examples 1 to 5 are added dropwise into a solution of resin for forming a capsule wall, wherein the components and weight percents thereof of each solution of resin are shown in Table below.

Phases separate due to the polar difference between the capsule core and the capsule wall. Using mechanical stirring rates of 200 to 1000 rpm, respectively, suspensions of particles having different particle diameters are formed by dispersing the capsule core compositions into the resin solutions. The resultant suspensions are filtered, screened, dried, and cured, thereby producing microcapsule particles having different particles diameters in the range of from 10 to 100 nm. The specific stirring rate and the resultant particle diameters are shown in Table 2.

TABLE 2

Components and Weight Percents of Microcapsules

| Components and Weight Percents of Microcapsules | Example 6 | Example 7 | Example 8 | Example 9 |
|---|---|---|---|---|
| Composition for capsule core | 5 wt % Capsule core composition produced in Example 2 | 10 wt % Capsule core composition produced in Example 3 | 15 wt % Capsule core composition produced in Example 2 | 20 wt % Capsule core composition produced in Example 3 |
| Resin for forming the capsule wall | 20 wt % epoxy resin | 20 wt % epoxy resin | 30 wt % polyurethane resin | 30 wt % polyurethane resin |
| Solvent | 75 wt % xylene | 70 wt % xylene | 55 wt % xylene | 50 wt % xylene |
| Process Parameters | | | | |
| Rotation Speed | 400 rpm | 600 rpm | 600 rpm | 800 rpm |
| Particle Diameters of Microcapsules | 85 nm | 60 nm | 55 nm | 35 nm |

III. Preparation of Composition for Overcoat Layer

Example 10 to 14 produce compositions for overcoat layer. 1-10 wt % of microcapsules, 1-20 wt % of epoxy group-containing acrylate resin, 1-20 wt % of curing agent, 70.5-83.5 wt % of organic solvent and 0.01-2 wt % of an adjuvant based on the total weight of the composition for overcoat layer (as shown in Table 3) are mixed homogeneously to give the desired composition for overcoat layer.

TABLE 3

Components and Weight Percents of Composition for Overcoat layer

| Components and Weight Percents of composition for overcoat layer | Example 10 | Example 11 | Example 12 | Example 13 | Example 14 |
|---|---|---|---|---|---|
| Epoxy group-containing acrylate resin | 1 wt % methyl acrylate-modified epoxy resin | 5 wt % ethyl acrylate-modified epoxy resin | 10 wt % methyl acrylate-modified epoxy resin | 15 wt % methyl methacrylate-modified epoxy resin | 20 wt % methyl methacrylate-modified epoxy resin |
| Curing agent | 20 wt % maleic anhydride | 1 wt % phthalic anhydride | 6 wt % trimellitic anhydride | 5 wt % polyamide resin-651 | 5 wt % polyamide resin-651 |
| Microcapsules | 1 wt % Microcapsules prepared in accordance with Example 6 | 10 wt % Microcapsules prepared in accordance with Example 7 | 2 wt % Microcapsules prepared in accordance with Example 8 | 5 wt % Microcapsules prepared in accordance with Example 9 | 2.5 wt % Microcapsules prepared in accordance with Example 6 |

TABLE 3-continued

Components and Weight Percents of Composition for Overcoat layer

| Components and Weight Percents of composition for overcoat layer | Example 10 | Example 11 | Example 12 | Example 13 | Example 14 |
|---|---|---|---|---|---|
| Organic solvent | 77.99 wt % propylene glycol monomethyl ether acetate (PGMEA) | 83.5 wt % propylene glycol monomethyl ether acetate (PGMEA) | 50 wt % propylene glycol monomethyl ether acetate (PGMEA); 31 wt % 3-ethyl ethoxypropionate | 50 wt % propylene glycol monomethyl ether acetate (PGMEA); 23.5 wt % 3-ethyl ethoxypropionate | 70.5 wt % propylene glycol monomethyl ether acetate (PGMEA) |
| Adjuvant | 0.01 wt % KH-560 | 0.5 wt % KH-560 | 0.5 wt % KH-560; 0.5 wt % EFKA-3883 | 1.0 wt % KH-560; 0.5 wt % EFKA-3883 | 1 wt % KH-570; 0.5 wt % KH-560; 0.5 wt % EFKA-3883 |

IV. Preparation of Overcoat Layer

Example 15 to 19 produce overcoat layers. The compositions for overcoat layer prepared in accordance with Example 10 to 14 are applied to clean glass substrates (370 mm*470 mm) on which BM and color photoresists have been applied. After drying under vacuum for 30 to 240 s, the substrates are baked at 200 to 250° C. in an oven for 20 to 50 min. Then, the baked coated glass substrates are cooled to room temperature, to give the overcoat layers of Examples 15 to 19. The specific process parameters are shown in Tables 4 and 5.

TABLE 4

Technical Conditions During Preparation of Overcoat Layers

| Process Steps | Parameters | | 1 | 2 | 3 |
|---|---|---|---|---|---|
| Coating | Thickness | μm | 1.5 | 2.0 | 2.0 |
| Drying under vacuum | Pressure | Pa | 20 | 30 | 40 |
| | Time | s | 40 | 30 | 25 |
| Baking | Temperature | ° C. | 230 | 240 | 240 |
| | Time | min | 25 | 25 | 30 |

TABLE 5

Technical Conditions During Preparation of Overcoat Layers Used in Example 15 to 19

| | Example 15 | Example 16 | Example 17 | Example 18 | Example 19 |
|---|---|---|---|---|---|
| Technical Conditions | 1 | 2 | 2 | 3 | 3 |

V. Test

For demonstrating the auto-repairing properties of the overcoat layer, the glass substrated coated with the overcoat layer was scratched, and observated for the status of the layer at the damaging site, and compared with a conventional overcoat layer.

The overcoat layers of Examples 15 to 19 are scratched to form 100 damaged points having a size of 30 to 50 μm, respectively, and then exposed to light radiation at 50 mJ/cm$^2$.

Overcoat layers having the same compositions as Example 18 and 19 except that they do not contains microcapsules are prepared and used as comparative examples 1 and 2. The overlayers of comparative examples 1 and 2 are scratched to form 100 damaged points having a size of 30 to 50 μm, respectively, and then exposed to light radiation at 50 mJ/cm$^2$.

Before and after light radiation, the overcoat layers of Examples 15 to 19 and Comparative Examples 1, 2 are tested by using Auto Optical Inspection (AOI) Instrument, recording the number of defects present thereon. The results are shown in Table 6 below.

TABLE 6

Test Results of Auto-repairing Property of Overcoat Layers

| Number of damaged points (30 to 50 μm) on the overcoat layers | Comparative Example 1 | Comparative Example 2 | Example 15 | Example 16 | Example 17 | Example 18 | Example 19 |
|---|---|---|---|---|---|---|---|
| Before light radiation | 100 | 100 | 100 | 100 | 100 | 100 | 100 |
| After light radiation | 100 | 100 | 11 | 9 | 10 | 8 | 9 |

It can be seen from the test that the overcoat layers will be damaged due to the presence of contaminated particles or scratch by external force. Such damages tend to be repaired via additional procedures, thereby increasing the complexity and cost of production technology. However, it can be seen from the results as shown in the above tables that the overcoat layers prepared by using the composition for overcoat layer of the embodiments of the present invention can reduce substantially such damages due to their auto-repairing property, e.g., the defect ratio thereof is around 10% of the defect ratio of the prior art overcoat layers. It is because a shear force caused by damage breaks the capsule wall, so that the capsule core composition flows out and fills the damaged positions. After light radiation, the auto-repairing of damage can be achieved, thereby reducing the complexity of technology and the cost of production, and improving substantially the pass ratio and quality of TFT-LCD products.

It is apparent that persons skilled in the art can make various modification and variation of the present invention without departing the spirit and scope of the present invention. Thus, provided that such modification and variation of the present invention fall within the scope of the appended claims and their equivalences, they are intended to be encompassed within the present invention.

The invention claimed is:

1. A composition for overcoat layer comprising: 1-10 wt % of microcapsules, wherein a wall of the microcapsule comprises an alkali-insoluble resin, the alkali-insoluble resin comprises an epoxy resin or a polyurethane resin, and a capsule core comprises:
   30-60 wt % of a photo-curable unsaturated resin oligomer;
   30-60 wt % of a photo-polymerizable monomer;
   1-10 wt % of a photoinitiator; and
   0-5 wt % of an additive; and
   the composition for overcoat layer further comprises:
   1-20 wt % of an epoxy group-containing acrylate resin;
   1-20 wt % of a curing agent;
   70.5-83.5 wt % of an organic solvent, the organic solvent comprises one or more selected from the group consisting of propylene glycol monomethyl ether acetate and 3-ethyl ethoxypropionate; and
   0.01-2 wt % of an adjuvant.

2. The composition for overcoat layer of claim 1, wherein:
   the photo-curable unsaturated resin oligomer comprises one or more selected from the group consisting of epoxy acrylic resin, polyester acrylic resin, and polyurethane acrylate;
   the photo-polymerizable monomer comprises one or more selected from the group consisting of dipentaerythritol hexacrylate, trimethylolpropane triacrylate, pentaerythritol tetracrylate, and dipentaerythritol pentacrylate; and
   the photoinitiator comprises one or more selected from the group consisting of benzoin, benzoin dimethylether, deoxybenzoin, α-hydroxyalkylphenone, aroyl phosphine oxide, dibenzoylphenylphosphine oxide, benzophenone, 2,4-dihydroxybenzophenone, thiopropoxythioxanthone and isopropylthioxanthone.

3. The composition for overcoat layer of claim 1, wherein:
   the epoxy group-containing acrylate resin comprises one or more selected from the group consisting of methyl acrylate-modified epoxy resin, methyl methacrylate-modified epoxy resin, ethyl acrylate-modified epoxy resin, ethyl methacrylate-modified epoxy resin, butyl acrylate-modified epoxy resin, butyl methacrylate-modified epoxy resin, acrylate copolymer-modified epoxy resin and methacrylatecopolymer-modified epoxy resin; and
   the curing agent comprises one or more selected from the group consisting of maleic anhydride, phthalic anhydride, trimellitic anhydride and polyamide resin.

4. The composition for overcoat layer of claim 1, wherein the additive and the adjuvant are one or more selected from the group consisting of adhesion promotor and leveling agent, respectively.

5. A method of producing the composition for overcoat layer comprising:
   mixing and dispersing 30-60 wt % of a photo-curable unsaturated resin oligomer, 30-60 wt % of a photo-polymerizable monomer, 1-10 wt % of a photoinitiator, and 0-5 wt % of an additive to produce a composition for capsule core of microcapsule;
   adding the composition for capsule core dropwise into a solution for capsule wall of microcapsule to form a composition for microcapsule, wherein a capsule wall of microcapsule comprises an epoxy resin or a polyurethane resin; and
   mixing 1-10 wt % of microcapsules with other components of the composition for overcoat layer to form the composition for overcoat layer;
   wherein the other components of the composition for overcoat layer comprises 1-20 wt % of an epoxy group-containing acrylate resin, 1-20 wt % of a curing agent, 70.5-83.5 wt % of an organic solvent, and 0.01-2 wt % of an adjuvant, the organic solvent comprises one or more selected from the group consisting of propylene glycol monomethyl ether acetate and 3-ethyl ethoxypropionate.

6. The method of producing the composition for overcoat layer of claim 5, wherein the mixing and dispersing 30-60 wt % of the photo-curable unsaturated resin oligomer, 30-60 wt % of the photo-polymerizable monomer, 1-10 wt % of the photoinitiator, and 0-5 wt % of the additive to produce the composition for capsule core comprises:
   mixing 30-60 wt % of the photo-curable unsaturated resin oligomer, 30-60 wt % of the photo-polymerizable monomer, 1-10 wt % of the photoinitiator, and 0-5 wt % of the additive to form a mixture; and
   dispersing the mixture under agitation at 300 to 1,000 rpm for 1 to 4 hours.

7. A display apparatus comprising a color filter substrate, wherein the composition for overcoat layer of claim 1 is used to form the overcoat layer of the color filter substrate.

8. The method of producing the composition for overcoat layer of claim 5, wherein:
   the photo-curable unsaturated oligomer comprises one or more selected from the group consisting of epoxy acrylic resin, polyester acrylic resin, and polyurethane acrylate;
   the photo-polymerizable monomer comprises one or more selected from the group consisting of dipentaerythritol hexacrylate, trimethylolpropane triacrylate, pentaerythritol tetracrylate, and dipentaerythritol pentacrylate; and
   the photoinitiator comprises one or more selected from the group consisting of benzoin, benzoin dimethylether, deoxybenzoin, α-hydroxyalkylphenone, aroyl phosphine oxide, dibenzoylphenylphosphine oxide, benzophenone, 2,4-dihydroxybenzophenone, thiopropoxythioxanthone and isopropylthioxanthone.

9. The method of producing the composition for overcoat layer of claim 5, wherein:

the epoxy group-containing acrylate resin comprises one or more selected from the group consisting of methyl acrylate-modified epoxy resin, methyl methacrylate-modified epoxy resin, ethyl acrylate-modified epoxy resin, ethyl methacrylate-modified epoxy resin, butyl acrylate-modified epoxy resin, butyl methacrylate-modified epoxy resin, acrylate copolymer-modified epoxy resin and methacrylatecopolymer-modified epoxy resin; and the curing agent comprises one or more selected from the group consisting of maleic anhydride, phthalic anhydride, trimellitic anhydride and polyamide resin.

10. The method of producing the composition for overcoat layer of claim 5, wherein the additive and the adjuvant are one or more selected from the group consisting of adhesion promotor and leveling agent, respectively.

11. The display apparatus of claim 7, wherein the additive and the adjuvant are one or more selected from the group consisting of adhesion promotor and leveling agent, respectively.

* * * * *